United States Patent [19]
Mixon

[11] 4,259,185
[45] Mar. 31, 1981

[54] SLUDGE THICKENING APPARATUS

[76] Inventor: James A. Mixon, 5050 Stepp Ave., Jacksonville, Fla. 32216

[21] Appl. No.: 107,040

[22] Filed: Dec. 26, 1979

Related U.S. Application Data

[63] Continuation of Ser. No. 929,732, Jul. 31, 1978, abandoned.

[51] Int. Cl.³ .......................... C02F 11/02; C02F 3/20
[52] U.S. Cl. ................................ 210/195.3; 210/197; 210/220; 210/256; 210/261
[58] Field of Search ........... 210/194, 197, 220, 221 R, 210/195.1, 195.3, 256, 261; 261/77, 121 R; 417/108, 151, 179

[56] References Cited

U.S. PATENT DOCUMENTS

| | | | |
|---|---|---|---|
| 1,314,539 | 9/1919 | Rust | 417/108 |
| 1,867,512 | 7/1932 | Kusch | 210/220 X |
| 2,067,161 | 1/1937 | Durdin, Jr. | 210/197 |
| 2,076,529 | 4/1937 | Durdin | 210/197 |
| 2,090,384 | 8/1937 | Durdin | 210/197 |
| 2,353,358 | 7/1944 | Prager | 210/194 X |
| 2,413,838 | 1/1947 | Mallory | 210/221 R X |
| 2,630,749 | 3/1953 | Ball et al. | 261/77 X |
| 3,764,011 | 10/1973 | Owens | 210/197 X |
| 3,765,727 | 10/1973 | Santangelo et al. | 417/108 X |
| 4,139,457 | 2/1979 | Mackrle et al. | 210/261 X |

Primary Examiner—Robert H. Spitzer
Attorney, Agent, or Firm—Arthur G. Yeager

[57] ABSTRACT

Sludge thickening apparatus comprising a vertical tank including sludge inlet and outlet pipes, and a discharge pipe weir; a vertical hopper within the tank having walls which diverge outwardly from a hopper bottom toward a top opening wherein the weir has openings communicating with the hopper interior; a cover plate closing the top opening and having a raised central portion with an opening; and a baffle plate spaced from the bottom opening and having an opening therethrough. A vertical airlift member is supported by the bottom of the tank and extends through the baffle opening, the bottom opening and communicates with the cover opening. An assembly including an air shut-off valve selectively controls air to the airlift member whereby the shut-off valve is closed when the outlet pipe is opened.

11 Claims, 4 Drawing Figures

U.S. Patent Mar. 31, 1981 Sheet 2 of 2 4,259,185
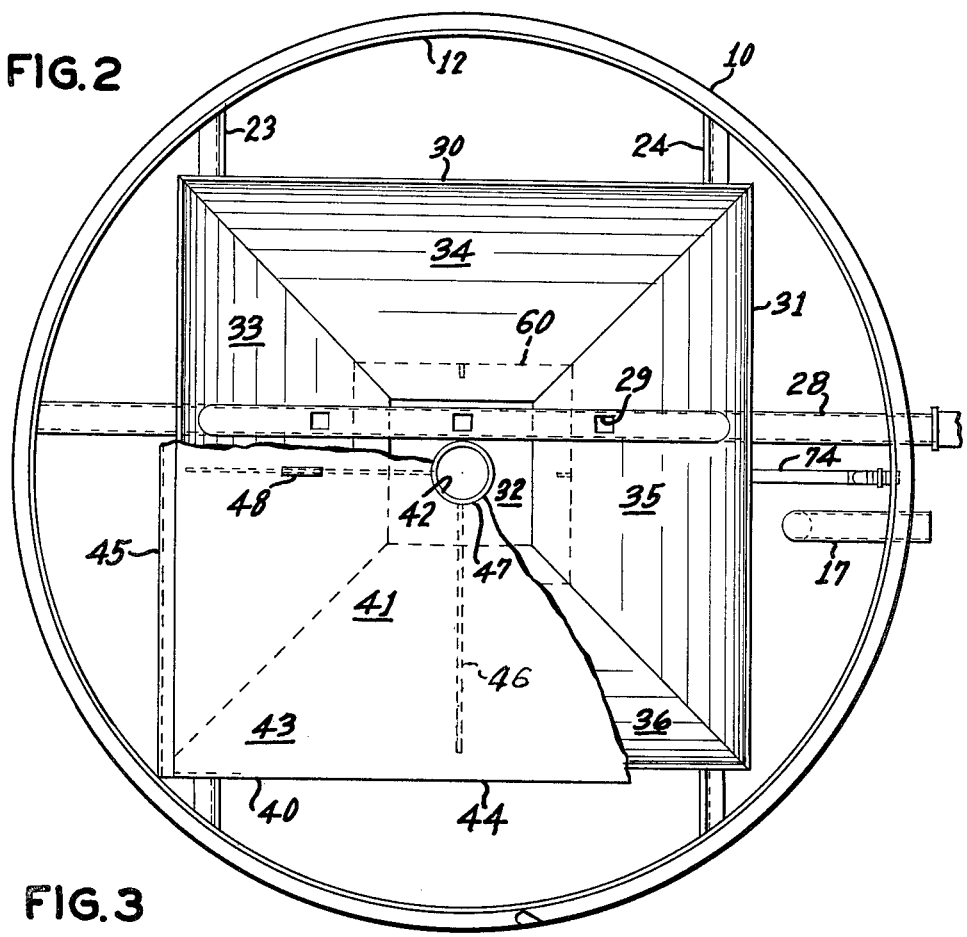
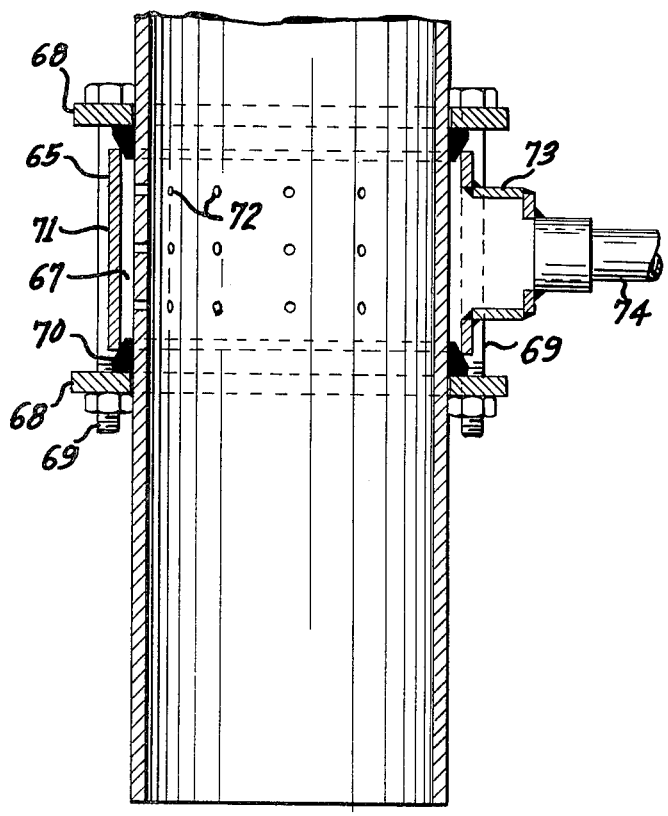

SLUDGE THICKENING APPARATUS

This is a continuation, of application Ser. No. 929,732, filed on July 31, 1978, now abandoned.

BACKGROUND OF THE INVENTION

1. Field of the Invention

The present invention relates to the treatment of sewage and more particularly to the stabilization, concentration and thickening of activated sludge present in sewage treatment processes.

Conventional sewage treatment plants which employ aerobic processes, such as the activated sludge process, commonly include an aeration chamber, a clarifier, a contact chamber and a sludge holding tank. Generally, these processes involve the mixing of organic material, in the form of raw sewage, with activated sludge, which contains the requisite aerobic bacteria, and subsequently aerating the mixture in an aeration chamber until the organic material is suitably biodegraded. Thereafter, the aerated mixture of activated sludge and raw sewage, referred to as a mixed liquor, is transferred to a settling chamber or clarifier where the activated sludge solids tend to separate from the liquid effluent, which is subsequently transferred to purifying contact chambers for further treatment. Although some of the settled activated sludge may be re-cycled to the aeration chamber and mixed with raw sewage, a periodic removal of a portion of the activated sludge from the treatment system is often required. For example, the activated sludge process requires a recycling of only a portion of the settled activated sludge with the remaining portion of the settled activated sludge removed to a sludge holding tank for further treatment. Further, for example, in the extended aeration process, wherein no excess activated sludge will be produced under theoretical conditions various insoluble products tend to accumulate and it is necessary to periodically remove a portion of the settled activated sludge from the treatment system.

The settled excess activated sludge removed from the clarifiers predominantly comprises liquid matter with a relatively small amount of solids, such as organic material and bacteria. Consequently, dehydration and concentration of the excess sludge often is relatively slow and difficult. Further, if the supply of oxygen to the excess sludge is deficient, anaerobic conditions often exist which causes the sludge to become septic and undergo fermentation with the resultant production of noxious gasses and odors. Under these anaerobic conditions it is often necessary to provide covers and other expensive equipment to neutralize and contain the noxious gasses. To avoid these difficulties, it is proposed to treat the excess sludge with a supply of oxygen to stabilize the sludge from septic conditions while the sludge solids are becoming separated from the liquid component of the sludge. Accordingly, air is introduced into the excess sludge in order to circulate the sludge and provide the necessary oxygen content.

This invention also relates to a sludge thickening apparatus which is comparatively economical to fabricate and operate. More specifically, the sludge thickening apparatus of the present invention incorporates a central airlift member for circulating the sludge whereby the air supplied thereto not only causes the sludge to circulate but also provides a source of oxygen for the sludge. Further, the sludge thickening apparatus includes a central separation tank having a lower opening communicating with a sludge receiving tank whereby the liquid matter separated from the sludge solids may be drawn off from a quiescent zone in the sludge receiving tank and discharged outwardly of the treatment apparatus. Thus, the treatment apparatus of the present invention comprises a comparatively simplified and efficient sludge treatment apparatus for thickening the sludge solids while effectively separating the liquid matter therefrom without the use of costly mechanical apparatus.

2. Description of the Prior Art

Sewage treatment systems which employ air to circulate sewage are generally exemplified by U.S. Pat. Nos. 2,638,444, 3,194,756, 3,696,029 and 4,008,159. Further, treatment systems which incorporate mechanical devices and/or air to circulate and mix sewage during various stages of treatment are exemplified by U.S. Pat. Nos. 2,473,297, 2,509,695, 3,439,807, 3,152,982 and 3,595,783. Of somewhat related interest are devices exemplified by U.S. Pat. Nos. 2,314,977, 2,343,836, 2,911,102 and 3,875,066. There are many problems with one or more of the above identified prior art and this invention is designed to alleviate some of such problems.

SUMMARY OF THE INVENTION

Accordingly, a broad aspect of this invention relates to a sludge thickening apparatus for treating sludge from a sewage treatment facility comprising a vertical tank having a bottom wall and an inlet means connected to the vertical tank for supplying sludge thereto; a vertical hopper disposed within and supported by the vertical tank and having top and bottom openings communicating with the interior of the vertical tank; a cover plate closing the hopper top opening; and a vertical airlift member supported by the vertical tank and having an upper end portion arranged to supply sludge above and onto an inclined surface of the cover plate and a lower end portion disposed below the hopper and adjacently above the bottom wall of the vertical tank. An air injector means is connected to the airlift member for selectively feeding air thereto thereby creating a suction for lifting sludge from the bottom portion of the vertical tank into the lower end portion of the airlift member and out of the upper end portion of the airlift member. The sludge solids tend to become separated from the liquid matter and a weir means disposed in the hopper has an opening communicating with the interior of the hopper for conveying the separated liquid in the hopper outwardly of the vertical tank. The sludge solids are conveyed from the bottom portion of the vertical tank through an outlet passageway communicating with the interior of the vertical tank.

Another aspect of this invention relates to a hopper having wall means defining the hopper top and bottom openings and diverging outwardly from the bottom opening toward the top opening. A baffle plate is spaced from the hopper lower end portion with spacer means connected to the baffle plate and hopper to support the baffle plate in spaced relation from the bottom opening and forming a restricted annular opening for the passage of liquid into the hopper.

A further aspect of this invention relates to a cover plate having a raised central portion with an opening extending therethrough and an upper surface portion contiguous with the raised portion and inclined downwardly therefrom. The baffle plate has an opening extending therethrough generally aligned with the cover plate opening and the airlift member extends through the baffle plate opening, the hopper bottom opening and communicates with the cover plate opening.

Still another aspect of this invention relates to an air injector means connected to the airlift member below the baffle plate for selectively feeding air to the airlift member thereby creating a suction for lifting sludge from the vertical tank and through the airlift member. An air supply means is connected to the air injector means for supplying air thereto and shut-off valve means is connected to the outlet passageway and to the air supply means for closing the air supply means when the outlet conduit is opened. The inlet means includes an inlet pipe having opposite end portions connected respectively to a sludge supply and to the vertical tank and an air feed means is connected to the inlet pipe for selectively feeding air thereto whereby a suction is provided for lifting sludge from the sludge supply through the inlet pipe and into the vertical tank. The air feed means is connected to the air supply means whereby the air supply to the air feed means is discontinued when the sludge outlet conduit is opened.

Accordingly, an object of the present invention is the provision of a simplified sludge treatment apparatus for thickening sludge solids and effectively separating the solids from the liquid components.

Another object is to provide an economical means for circulating the contents of the sludge treatment apparatus and introducing oxygen thereto.

A further object of the invention is the provision of a sludge treatment apparatus which requires a minumum amount of control and maintenance and is relatively economical to fabricate and operate.

Still another object is to provide a partially submerged liquid containment region whereby liquid matter separated from sludge solids may be accumulated and transported from the sludge treatment apparatus.

Yet another object of the present invention is the provision of air supply means connected to various conduit members for creating suction therein to introduce sludge into the treatment apparatus and circulate the sludge contained therein.

BRIEF DESCRIPTION OF THE DRAWINGS

The novel features which are believed to be characteristic of this invention are set forth with particularity in the appended claims. The invention itself, however, both as to its organization and method of operation, together with further objects and advantages thereof, must best be understood by reference to the following description taken in connection with the accompanying drawings, in which:

FIG. 2 is a top plan view of the sludge thickening apparatus with the hopper cover broken away to expose some of the constructional details of the hopper interior;

FIG. 3 is an enlarged sectional view of the air injection chamber for introducing air into the lift member; and FIG. 4 is an end elevational view of the shut-off valve assembly for selectively controlling the flow of sludge through the sludge outlet conduit and the flow of air supplied to the apparatus.

DESCRIPTION OF THE PREFERRED EMBODIMENT

Figure 1:
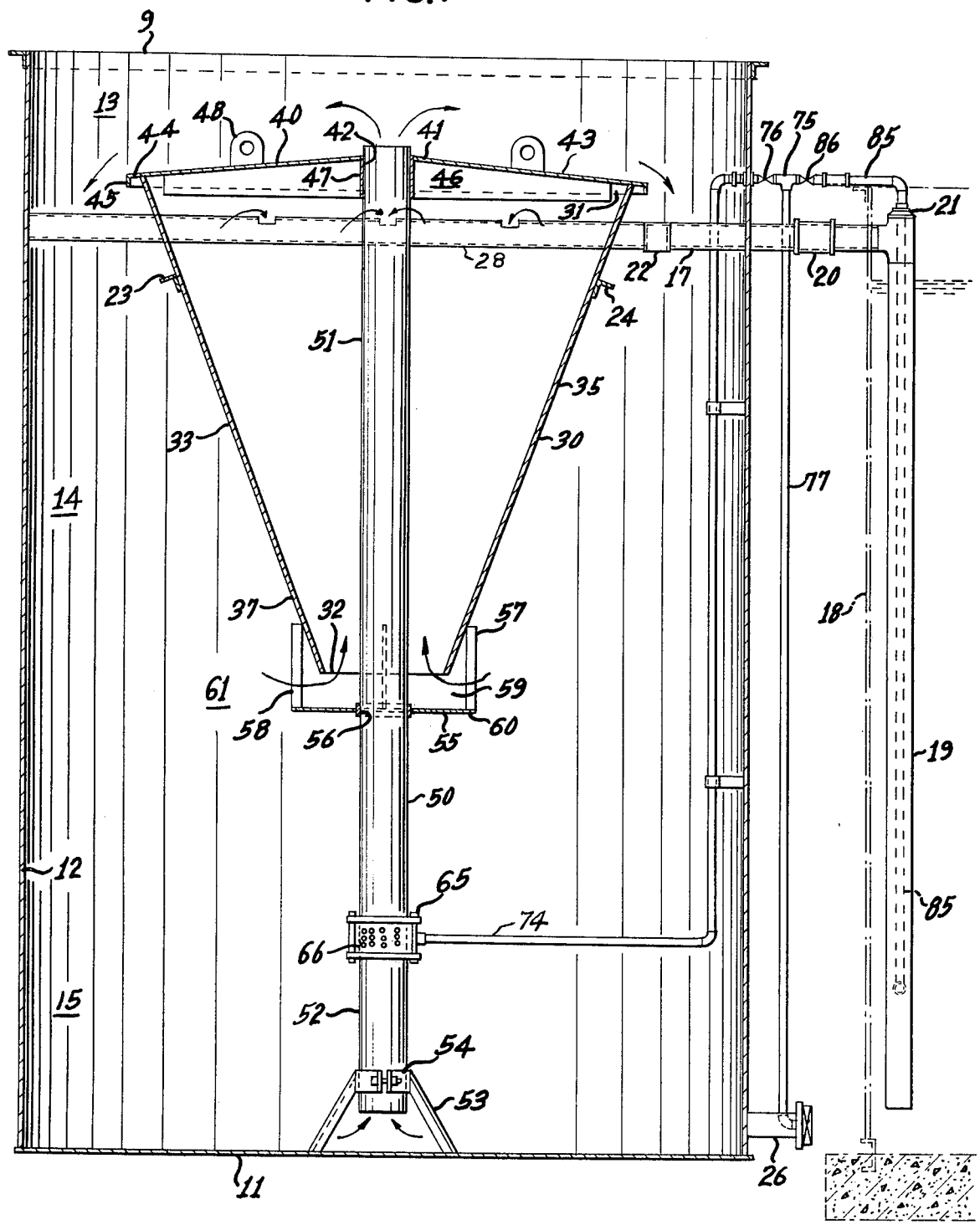
FIG. 1 is a sectional view of the interior of a sludge thickening apparatus, and an adjacent sludge holding tank of a sewage treatment facility being shown by broken lines.

Referring now more particularly to the drawings, the sludge thickening apparatus is generally represented by numeral 9 and includes a vertical tank 10, a generally vertical hopper 30 disposed within and supported by the vertical tank 10 and having a cover plate 40, a substantially vertical airlift member 50 supported by the tank 10 and extending through the hopper 30 and communicating with an opening 42 in the cover plate 40. Also, the sludge thickening apparatus 9 includes an air injector means 65 connected to the airlift member 50 for feeding air thereto, thereby creating a suction in the airlift member for lifting sludge from the bottom of the vertical tank 10 into a lower end portion 52 and out of an upper end portion 51 of the airlift. Additionally, the sludge thickening apparatus includes an air supply means 75 connected to the air injector means 65 for selectively supplying air thereto.

Vertical tank 10 includes a bottom wall 11 which, although shown as being generally horizontal, may be inclined or curved to permit the sludge particles to circulate more easily. Curved vertical wall 12 extends upwardly from the bottom wall 11 and defines a generally cylindrical vessel which may be provided with a cover if desired. For example, various noxious gasses and odors are often emitted from sludge treatment plants, particularly when anaerobic processes are involved or when the tanks become septic under deficient oxygen conditions. Under these circumstances it is often desirable to provide covers and other devices to confine and/or neutralize the unpleasant odors.

Extending through a top portion 13 of the vertical tank 10 is an inlet means in the form of a generally horizontal inlet pipe 17 having an opening 22 spaced from the inner surface of the vertical wall 12 so that the entering sludge will mix with the circulated sludge and not tend to accumulate on the inner surface of the vertical wall 12. If the entering sludge is transferred from another treatment vessel, such as sludge holding chamber 18 shown in FIG. 1, a generally vertical pipe 19 is connected through pipe connection 20 with inlet pipe 17. To allow for maintenance or periodic cleaning, a clean-out plug 21 is provided in the upper region of vertical pipe 19.

Vertical hopper 30 is supported within vertical tank 10 by a pair of spaced struts 23 and 24 welded or otherwise connected to the inner surface of the top portion 13 of the vertical tank 10 and attached to spaced wall sections of the hopper 30. The hopper includes top opening 31 located in the top portion 13 of the vertical tank 10 and a bottom opening 32 located in the intermediate portion 14 of the vertical tank. Top and bottom openings 31 and 32 are defined by wall means in the form of one or more inclined walls which diverge outwardly from the bottom opening 32 toward the top opening 31. The preferred illustrated embodiment of FIGS. 1 and 2 depicts a hopper 30 including inclined walls 33, 34, 35 and 36 which define the generally square top and bottom openings 31 and 32. However, other hopper shapes, such as an inverted truncated cone, and hopper openings of diverse shapes and sizes may also be employed within the scope of the invention. A weir means in the form of a generally horizontal conduit 28 extends through the top portion of the exterior vertical wall 12, through inclined hopper side walls 33 and 35 and is connected to the interior surface of the vertical wall 12. The conduit 28 includes one or more weir openings 29 communicating with the interior of the hopper 30 for conveying liquid in the hopper, such liquid being separated from the sludge solids, outwardly of the vertical tank 10. Under operating conditions the fluid level in the vertical tank will fluctuate between the weir conduit 28 and hopper top opening 31 so that the separated liquid will flow into conduit 28 when weir opening 29 is submerged in the separated liquid. The distance between the weir opening 29 and hopper top opening 31 is selected such that under operational conditions the level of the sludge in the vertical tank will not rise above the level of the hopper top opening 31, overflow into the hopper 30 and thus contaminate the separated liquid in the hopper with the relatively unsettled sludge material and floating debris.

A cover plate 40 closes the hopper top opening 31, as shown in FIG. 1 and partially shown in FIG. 2, and includes a central portion 41 having an opening 42 extending therethrough. The central portion 41 is raised above the remainder of the cover plate 40 with the adjacent contiguous upper surface portions 43 inclined downwardly from the central portion towards the perimeter 44 of the cover plate and, as illustrated in FIGS. 1 and 2, the cover plate 40 preferably has a generally pyramidal configuration. The perimeter 44 of the cover plate 40 is designed to extend outwardly of the hopper opening 31 when it is properly disposed on the hopper 30 to permit fluid matter to flow along the surface of the inclined cover plate 40 without seeping into the interior of the hopper 30. Additionally, a depending flange 45 is formed along the outer peripheral edge of the cover plate 40 to provide a run-off surface and structurally reinforce the cover plate. Additional structural reinforcement of the cover plate 40 is provided by one or more reinforcing plates 46 welded or otherwise secured to the lower surface of the cover plate as shown in FIGS. 1 and 2. The reinforcing plates include inner end portions connected to a cylindrical tubular section 47 which is connected to the cover plate and further defines cover plate opening 42. In order to lift the cover plate 40 from the hopper 30, one or more lifting tabs 48 are provided on the top surface of the cover plate.

A vertical airlift member 50 is supported by the vertical tank 10 and includes an upper end portion 51 arranged to supply sludge above and onto the upper surface of the cover plate and a lower end portion 52 disposed below the hopper 30 and supported above the bottom wall 11 of the vertical tank 10 by brace elements 53. The brace elements 53, shown in FIG. 1, comprise a plurality of spaced struts, each having one end portion connected to a clamping ring 54, which surrounds the airlift member 50, and an opposite end portion resting on the bottom wall 11. The upper end portion 51 of the airlift 50 is adapted to communicate with the tubular sleeve 47, which defines the cover plate opening 42. Positioned somewhat intermediate of the airlift member upper and lower end portions is a generally horizontal baffle plate 55 having a central opening 56 adapted to receive the airlift member 50. Baffle plate 55 is spaced from the lower end portion 37 of the hopper 30 by spacing means 57 in the form of strut elements 58 welded, bolted or similarly connected to the baffle plate 55 and extending to the hopper 30. When properly positioned, the spacer means support the baffle plate in spaced relation to the hopper bottom opening 32 and form a restricted annular opening, generally represented by numeral 59 in FIG. 1. As shown in FIG. 1 and in broken lines in FIG. 2, the baffle plate 55, which is somewhat larger than bottom opening 32, is positioned below bottom opening 32 so that a perimeter portion 60 is defined which extends axially outwardly of the bottom opening 32. As a result, the baffle plate 55 will tend to deflect the sludge which would otherwise move upwardly from the bottom portion 15 of the vertical tank 10, through the bottom opening 32 and into the interior of the hopper. Upward movement of the sludge solution may be caused by numerous factors such as air escaping from the air injector means or fluid updrafts resulting from circulation of the sludge in the vertical tank 10.

As a result of the configuration and relative positions of the various components of the sludge thickening apparatus 9, the restricted annular opening 59 is located in a quiescent zone 61 of the vertical tank 10. For example, sludge deposited onto the upper surface of the cover plate 40 from the airlift member 50, flows outwardly toward the perimeter 44 while it is exposed to the atmosphere. Upon flowing off of the cover plate 40 the sludge mixes with the sludge material in the top portion 13 of the vertical tank 10, whereupon, the sludge solids tend to settle toward the bottom portion 15 while the lighter floating debris remains on the surface of the sludge material in the vertical tank 10. As a result of the inwardly declined hopper walls 33-36, the hopper bottom opening 32 and annular opening 59 are removed from the downward flow path of the sludge solids and a quiescent zone 61 is defined adjacent openings 32 and 59. With the introduction of sludge into the sludge thickening apparatus 9, the liquid level in the vertical tank 10 rises which causes a consequent rise in the liquid level in the hopper 30 until the weir opening 29 becomes submerged whereupon the separated liquid contained in hopper 30 flows outwardly therefrom through conduit 28. An air injector means 65 in the form of an air injection collar 66, an enlarged view being shown in FIG. 3, embraces the airlift member 50 and defines a circumferential air chamber 67. The air chamber 67 communicates with the interior of the airlift member 50 with a plurality of air holes 72 formed in the wall of the airlift 50. The air injection collar 66 includes a pair of spaced ring collars 68 having a plurality of holes therein adapted to receive threaded bolts 69. Disposed in abutting relationship with the facing surfaces of the ring collars 68 are circular rubber wedge rings 70 which have inclined surfaces engaged by edge portions of sleeve 71. As the threaded bolts 69 are tightened a clamping force is exerted upon the rubber wedge rings 70 whereby a wedging action is created between the airlift member 50, the spaced rubber wedge rings 70 and the sleeve 71 and a substantially fluid tight air chamber 67 is created. A connection 73 is welded to the sleeve 71 so that one end of an air line 74 may be removably secured thereto. The other end of air line 74 extends through the top portion 13 of the vertical wall 12 of tank 10 and is connected to an air supply means 75 through an air supply control valve 76. The air supply means 75, which selectively feeds air to the air injection chamber 67 through control valve 76, includes a vertical air pipe section 77 connected with an air shut-off valve 78 of a shut-off valve means. As shown in FIG. 4, the shut-off valve means also includes a sludge draw-off valve 78 mechanically coupled to sludge draw-off valve 27, which is attached to sludge outlet pipe 26, so that air shut-off valve 78 is closed when the sludge draw-off valve 27 is opened. For example, when lever 80 is rotated upwardly about pivot 81, as shown in FIG. 4, linkage 82 moves downwardly closing air shut-off valve 78 and simultaneously linkage 83 moves upwardly opening sludge draw-off valve 27. Further, although sludge outlet pipe 26 is illustrated in FIG. 1 as being located beneath the opening 22 of the inlet pipe 17, the pipe 26 and inlet pipe 17 may be offset from each other to prevent newly introduced sludge in inlet pipe 17 from settling and accumulating on the bottom wall adjacent to outlet pipe 26.

When an inlet pipe 19 is employed to transfer sludge from sludge holding chamber 18 to the vertical tank 10, an air feed means in the form of an air line 85 extends between the inlet pipe 19 and the air pipe 77 of the air supply means. An air supply control valve 86 is connected between the air pipe 77 and air line 85 for controlling the supply of air to inlet pipe 19.

In operation, sludge is transferred from a sludge holding tank 18 of a sewage treatment plant or the like via vertical pipe 19 and through inlet pipe 17 into the top portion 13 of the vertical tank 10 by a sludge airlift in the form of air feed means 85 connected to the vertical pipe 19. Under operating conditions, the level of sludge material contained in vertical tank 10 will be located at or proximate to inlet opening 22 and the inflowing sludge will tend to mix with the circulated sludge material with the heavier sludge solids settling towards bottom wall 11 of the vertical tank 10. When air under a suitable pressure is supplied through airline 74 to air injection means 65 a suction is created therein for lifting the sludge particles in the bottom portion 15 of the vertical tank 10 into the lower end portion 52 and out of an upper end portion 51 of the airlift. For example, for a sludge thickening apparatus having a vertical tank with a diameter of about twelve feet and a vertical dimension of about eighteen feet and a tubular airlift member with an inside diameter of about nine inches and a vertical dimension of about sixteen feet, an air pressure range of about 7 to about 7½ p.s.i. supplied to the air injector means 65 of the airlift member 50 has provided adequate and efficient circulation for the sludge material. The rate of circulation is dependent not only on the air pressure supplied to the air injection means 65 but also the relative degree of closure of each of the air control valves 76 and 86. Similarly, when a vertical inlet pipe 19 having an inside diameter of about 4 inches and a vertical dimension of about 16 feet is employed with inlet pipe 17, an air pressure range of 7 to 7½ p.s.i. fed through air feed means 85 and properly controlled by air supply control valve 86 has provided sufficient suction to convey sludge material into the vertical tank 10.

Upon exiting from the airlift member 50 through the cover plate opening 42, the sludge material is partially aerated as it flows off the inclined surface portions 43 of the cover plate 40 and mixes with the sludge material in the vertical tank. The sludge solids tend to settle in bottom portion 15 of the vertical tank with the separated liquid component egressing from the vertical tank through annular opening 59 and hopper bottom opening 32. As a result of the configuration and location of the inwardly declined hopper walls and the position of baffle plate 55, a quiescent zone is defined adjacent openings 59 and 32 and the separated liquid which flows into the hopper 30 is relatively free of sludge solids. Due to the relatively large interior volume of the hopper 30, any solids which migrate into the interior of the hopper will tend to settle, falling through hopper bottom opening 32 and being deposited on baffle plate 55. A hopper 30 having a vertical height of about eight feet, a square bottom opening of about four square feet and a square top opening of about sixty-four square feet was constructed with the vertical tank of the aforementioned dimensions. Generally, sludge solids comprise about 20,000 to 25,000 p.p.m. or 2-2½% of the total sludge material, with liquid matter comprising the remainder of the sludge material. For example, for a 12,000 gallon sludge thickening tank employed to thicken sludge removed from a 115,000 gallon sludge holding tank in a 500,000 g.p.d. sewage treatment plant it is necessary to periodically dispose (e.g. every two or three days) of relatively small amounts of separated thickened sludge accumulated in the sludge thickening tank as compared with the relatively large amount of sludge otherwise accumulated in a sludge holding tank of a sewage treatment plant. The separated liquid in the sludge thickening tank can be recycled to one or more treatment chambers of the sewage treatment plant, for example, to the sludge holding tank and/or the aeration chamber.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

What is claimed as new and what it is desired to secure by Letters Patent of the United States is:

1. A sludge thickening apparatus for treating sludge from a sludge holding tank of a sewage treatment facility comprising a vertical tank having a bottom wall and an inlet means connected to said vertical tank for supplying sludge thereto; a vertical hopper disposed within and supported by said tank and having a top opening and a bottom opening communicating generally medially in both horizontal and vertical directions with the interior of said tank; a cover plate closing said hopper top opening; said hopper including wall means defining said top opening and said bottom opening and a side wall diverging outwardly substantially from said bottom opening to said top opening; a vertical airlift member supported by said tank and having an upper end portion arranged to supply sludge above and onto said cover plate and a lower end portion disposed below said hopper and adjacently above said bottom wall of said tank; air injector means connected to said airlift member for selectively feeding air thereto thereby creating a suction for lifting sludge from said tank into said lower end portion and out said upper end portion; and weir means disposed in said hopper and having an opening communicating with the interior of said hopper for conveying separated liquid in said hopper outwardly of said tank, an outlet means connected to said vertical tank for conveying sludge outwardly of said tank, and selective shut-off valve means connected to said outlet means for opening same and discontinuing the supply of air to said air injector means and for closing said outlet means and starting the supply of air to said air injector means.

2. The apparatus according to claim 1 wherein said cover plate has an opening therethrough and said airlift member extends through said hopper bottom opening and has its said upper end portion communicating with said opening of said cover plate.

3. The apparatus according to claim 2 wherein said hopper includes wall means defining said bottom and top openings and diverging outwardly from said bottom opening toward said top opening.

4. The apparatus according to claim 1 wherein said weir means comprises a generally horizontal conduit extending through an exterior wall of said vertical tank and a wall portion of said hopper and said separated liquid flows into said weir conduit, and wherein said hopper includes wall means defining said bottom and top openings and said wall means diverging outwardly from said bottom opening toward said top opening, said hopper bottom opening being located in and communicating with an intermediate portion of said vertical tank, and further comprising an outlet conduit connected to said vertical tank for conveying sludge outwardly thereof.

5. The apparatus according to claim 1, wherein said inlet means includes an inlet pipe having opposite end portions connected respectively to a sludge supply and said vertical tank and further comprising an air feed means connected to said inlet pipe for selectively feeding air thereto, creating a suction for lifting sludge from said sludge supply through said inlet pipe and into said vertical tank.

6. The apparatus according to claim 5, further comprising air supply means connected to said air injector means and said air feed means for selectively supplying air thereto.

7. The apparatus according to claim 1, wherein said vertical tank is substantially cylindrical and has a bottom portion, an intermediate portion and a top portion; said vertical hopper includes a lower end portion and side walls defining said bottom and top openings and said side walls diverging outwardly from said bottom opening toward said top opening, said bottom opening communicating with said intermediate portion of said vertical tank; a horizontal baffle plate having an opening and being located in said intermediate portion of said vertical tank above said air injector means and spaced below said hopper lower end portion; spacer means connected to said baffle plate and said hopper to support said baffle plate in spaced relation to said bottom opening and forming a restricted annular opening for the passage of liquid into said hopper; said cover plate being located in the top portion of said vertical tank and having a raised central portion with an opening extending therethrough and surface portions contiguous with said raised portion and inclined downwardly from said raised portion; and said airlift member comprises an elongated tube disposed centrally of said vertical tank with the tube lower end portion being supported above said vertical tank bottom wall and said tube extending through said baffle opening and said hopper bottom opening with the tube upper end portion communicating with said cover plate opening.

8. A sludge thickening apparatus for treating sludge from a sludge holding tank of a sewage treatment facility comprising a vertical tank having a bottom wall and an inlet means connected to said vertical tank for supplying sludge thereto; a vertical hopper disposed within and supported by said tank and having a top opening and a bottom opening communicating generally medially with the interior of said tank; a cover plate closing said hopper top opening; a baffle plate spaced from said hopper bottom opening, and spacer means connected to said baffle plate and hopper to support said baffle plate in spaced relation to said bottom opening and forming a restricted annular opening for the passage of liquid into said hopper medially of said tank; a vertical airlift member supported by said tank and having an upper end portion arranged to supply sludge above and onto said cover plate and a lower end portion disposed below said hopper and adjacently above said bottom wall of said tank; air injector means connected to said airlift member for selectively feeding air thereto thereby creating a suction for lifting sludge from said tank into said lower end portion and out said upper end portion; and weir means disposed in said hopper and having an opening communicating with the interior of said hopper for conveying separated liquid in said hopper outwardly of said tank, an outlet means connected to said vertical tank for conveying sludge outwardly of said tank, and selective shut-off valve means connected to said outlet means for opening same and discontinuing the supply of air to said air injector means and for closing said outlet means and starting the supply of air to said air injector means.

9. The apparatus according to claim 8, wherein said cover plate has an opening therein, and said baffle plate has an opening extending therethrough and generally vertically aligned with said cover plate opening, said airlift member extending through said aligned openings.

10. The apparatus according to claim 8, wherein said baffle plate has an opening extending therethrough and said cover plate has a raised portion with an opening extending therethrough, and said cover plate further including an upper surface portion contiguous with said raised portion and inclined downwardly from said raised portion, and said airlift member extending through said baffle plate opening and said hopper bottom opening with its said upper end portion communicating with said cover plate opening.

11. The apparatus according to claim 10, wherein said baffle plate is located above said air injector means.

* * * * *